United States Patent [19]

Kaminstein

[11] 4,326,006
[45] Apr. 20, 1982

[54] NON-SLIP PLACE MAT

[76] Inventor: Bernard Kaminstein, 29 Third Ave., New York, N.Y. 10003

[21] Appl. No.: 231,687

[22] Filed: Feb. 5, 1981

[51] Int. Cl.$^3$ .................... B32B 3/00; B32B 9/06; C08L 7/02; C08L 91/00
[52] U.S. Cl. .................... 428/204; 260/745; 428/205; 428/319; 428/486; 523/100; 524/276; 524/277; 524/278; 524/405; 428/311.7
[58] Field of Search .............. 428/203, 204, 205, 319, 428/318, 34, 322, 342, 485, 486; 260/28.5 B, 28.5 R, 745

[56] References Cited

U.S. PATENT DOCUMENTS

| | | | |
|---|---|---|---|
| 1,971,337 | 8/1934 | Collins | 428/318 |
| 2,173,129 | 9/1939 | Oglesby | 428/319 |
| 2,444,443 | 7/1948 | Hesselroth | 428/319 |
| 3,400,008 | 9/1968 | Blegle et al. | 260/28.5 R |
| 3,485,784 | 12/1969 | Waples, Jr. | 428/486 |
| 3,607,348 | 9/1971 | Wray et al. | 428/319 |
| 3,647,733 | 3/1972 | McDonald | 260/28.5 B |
| 4,117,199 | 9/1978 | Gotoh et al. | 260/28.5 B |

*Primary Examiner*—William R. Dixon, Jr.
*Attorney, Agent, or Firm*—Stephen E. Feldman; Marvin Feldman; Steve T. Zelson

[57] ABSTRACT

A place mat is disclosed which comprises a paper sheet and a composition coating comprising a blend of water, a water soluable salt, a wax and a polymeric material which both coats and impregnates the paper sheet, whereby said sheet is rendered substantially hydrophobic and it and items placed on it are rendered substantially slip resistant when resting on a tray or table which may be subject to sudden movement. The non-slip place mat is particularly useful for airline serving trays.

36 Claims, 2 Drawing Figures

U.S. Patent  Apr. 20, 1982  4,326,006 ical sheet to form a coated, printed sheet in one operation.

NON-SLIP PLACE MAT

FIELD OF THE INVENTION

This invention relates to paper place mats. More specifically, this invention relates to a composition coated, non-slip paper place mat.

BACKGROUND AND DISCUSSION OF THE PRIOR ART

It was known in the prior art to coat cellulose or paper sheets with different substances so as to impart various desired characteristics, such as in U.S. Pat. No. 1,971,337 to H. B. Collins, granted Aug. 28, 1934, which relates to a coaster pad waterproofed by a layer of asphaltum or rubber cement.

The prior art, specifically, U.S. Pat. No. 2,444,443 to C. F. Hesselroth, granted July 6, 1948, also discloses a wrapping tape or sheet which comprises a wax coated web of fibers in combination with a non-porous hydrophobic organic film such as cellulose acetate.

U.S. Pat. No. 2,173,129 relates to a coated and impregnated paper which may be used for covering boxes and containers or for use as table covers and the like. This reference incorporates semi-drying oils, drying oils and resins in the presence of a selected percentage of water being based on the paper weight. Paint, lacquer, varnish and/or resin is also applied to the paper to further impart waterproof characteristics.

U.S. Pat. No. 3,607,348, granted Sept. 21, 1971, to Wray et al, discloses a cellulose fiber or tissue paper structure for use in a printing process which is coated twice on one side with hydrophobic and hydrophilic compositions. This reference discloses the use of waxes in combination with polymers and/or resins as a discontinuous coating over one side of the tissue paper whereby the porosity of the paper is not altered.

In addition, of course, is the well known household commercial product "wax paper" which basically comprises a wax impregnated cellulose sheet.

It was also commonly known in the prior art to manufacture place mats out of uncoated or non-impregnated paper. In addition, it was also commonly known to use urethane foam-backed plastic films, whereby the foam provided cushioning and prevented slippage of said place mat when the surface upon which it rested moved and wherby the plastic film provided the hydrophobic surface.

Now there is provided by the present invention a non-slip paper place mat.

It is another object of the present invention to provide a method for making a coating for incorporation into paper for making a non-slip place mat.

It is another object of this invention to provide a hydrophobically coated paper non-slip place mat.

It is a further object of this invention to provide a place mat which will render objects placed thereon resistant to slippage when said place mat is resting on a surface and is subjected to movement.

It is an additional object of this invention to provide a printed and coated paper place mat wherein the printing and coating act together to create a water resistant surface.

It is still another object of this invention to provide a non-slip place mat for use on surfaces subject to sudden movement, such as home dining tables and the food trays of mass transit vehicles, such as airplanes, trains, boats and buses.

The aforesaid as well as other objects and advantages will be made more apparent in reviewing the attached drawings and in reading the following description and the adjoined claims.

DESCRIPTION OF THE PREFERRED EMBODIMENTS

Figure 1:
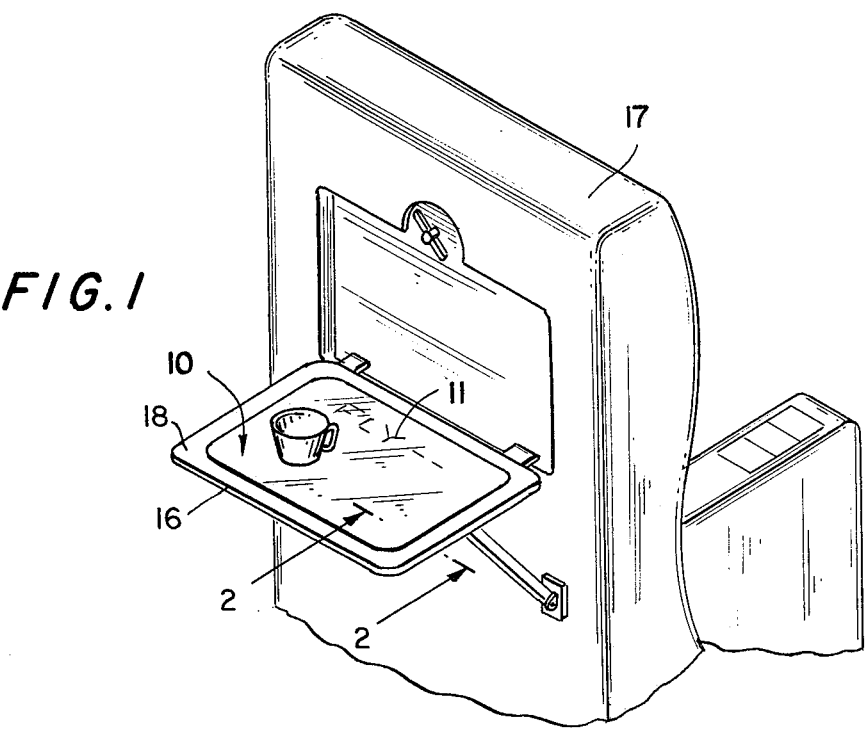
FIG. 1 is a perspective view of the place mat of the invention while in use on an airline tray.

Broadly speaking, one preferred embodiment of the present invention is a composition coated paper place mat. More specifically, said place mat has a printed surface on one side and a non-printed surface on the other and a coating composition of differing thickness on both sides of said mat. As shown in FIG. 1, the printing is visible through the top 19 of the coating composition of the place mat.

In another aspect the place mat of this invention comprises:
  a. a paper sheet; and
  b. a composition coating comprising a blend of water, a water soluble salt, a wax and a polymeric material, wherein the composition coating both coats and impregnates the paper sheet whereby the paper sheet is rendered substantially hydrophobic and is slip resistant to items placed in contact with the sheet.

In a more specific aspect the place mat of this invention comprises:
  a. a printed paper sheet; and
  b. a composition coating comprising a blend of water, sodium borate, beeswax having a molecular weight up to about 2,000 and a polymeric material having a molecular weight of at least 5,000.

A method for the preparation of the coating composition of the preferred embodiment of this invention generally comprises:
  a. heating an amount of water;
  b. melting an amount of wax;
  c. adding to the heated water of step a., an amount of water soluble salt;
  d. adding the wax of step b. to the mixture of step c.; and
  e. adding the mixture of step d. to a polymeric material.

Referring to FIG. 1, the place mat of the present invention 10, is placed on the surface 18 of a foldable tray 16 on the back of airline type seat 17. The place mat is non-slip both as to the tray 16, surface 18, as well as to any objects disposed on the top 19 of the mat. The mat 10 may be conventionally printed with any desired design 11, and may be cut into any desired shape or size, although preferably into a substantially rectangular shape about 9" wide by 15" long as shown in FIG. 1. Further, the place mat may be constructed in such a manner as to permit the printing to work in conjunction with the coating to impart more effective water-proof characteristics.

It is also envisioned, however, that printing ink pigments may be directly incorporated into the coating composition before said coating is applied to the cellulose or paper sheet. In this manner both coating and printing may be applied to the paper at the same time. Alternatively, printing ink, dyes, or colors may be directly incorporated into the paper fibers at, during or after paper formation.

Figure 2:
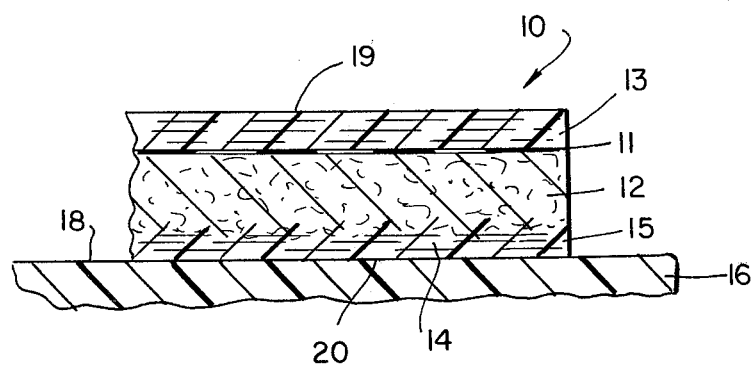
FIG. 2 is a greatly enlarged sectional view of the place mat taken along lines 2—2 of FIG. 1, to indicate the inter-relationship of the various layers.

Referring now to FIG. 2, the place mat 10 is shown, comprising a cellulose fiber or paper sheet 12 upon which is applied printing 11 and a coating composition both above 13 said printing and below 14 said cellulose fibers or paper sheet. As indicated in FIG. 2, the preferred embodiment of coating composition comprises a thicker layer over the printed surface than on the non-printed surface of the cellulose sheet. It is envisioned, however, that the coating composition could be of an even thickness on both the top and bottom surfaces, for instance, when the ink pigments are directly incorporated therewith or, alternatively, in a thicker layer over the non-printed surface than over the printed surface. Never at anytime, however, need the coating be more than a fraction of an inch thick. Generally, its thickness would be only about 1 mil. or less. More specifically, approximately 3 lbs. of the composition coating would be spread evenly over 3,000 sq. ft. of paper or approximately 1.5 lbs. per side. A heavier application, so as to create a thicker coating, may also be used, if desired. When the coating composition is applied to the non-printing surface 15 it is more absorbed into the cellulose or paper fibers on the non-printed side than on the printed side.

In addition, different grades, thickness and types of paper may be selected with characteristics further affecting the degree of absorbtion of the coating composition. The preferred weight or grade of the paper is about 30 lbs./ream; however, almost any weight paper, from about 10 to 100 lbs./ream, may be utilized effectively.

Without wishing to be bound by any theory or mechanism, it is probable that ink printed on the surface of the cellulose or paper fibers acts as a holdout preventing absorbtion of the coating composition to a greater degree than on the non-printed side. Indeed, in the practice of this invention, the bottom non-printed side may only require a thinner coating due to electrostatic attraction between the place mat surface 15 and the surface 18 of the tray or table 16 it rests on at level 20. Furthermore, the thicker coating on the printed side would impart stronger hydrophobic characteristics where it would be most needed.

The polymeric material of this invention and its embodiments may comprise a broad range of natural and synthetic polymers including, by way of example, acrylics, natural and synthetic latex, neoprene or any like compound. It is further within the contemplation of this invention that a combination of two or more polymers or acrylics may be used as the polymeric material. The polymeric material of this invention, when added to the water, wax and water soluble salt may be in a solid form, a powdered solid form, dispersed in solution, dissolved in a solvent solution, or in an otherwise flowable form by the addition of heat to melting temperature, or a plasticizer known in the art. Preferably, the polymeric material is in a flowable form dissolved in a solvent solution.

It is also within the contemplation of this invention that the acrylic is an acrylic elastomer or rubber. Another preferred polymer is synthetic latex. Other useful polymers include butadiene rubber, polystyrene, and polyvinylidene chloride. A commercially available polymer preferably used with this invention is Goodrich 308 acrylic latex.

The water soluble salt of this invention may preferably be comprised of a sodium salt such as sodium borate, otherwise known as borax. Other water soluble salt, particularly the alkali or alkaline earth metal salts, are also within the contemplation of the invention.

The wax or pariffin of this invention may be comprised of a beeswax, a microcrystalline wax or any like wax. The ratio of water to wax to water soluble salt of this invention is about 1:0.1 to 0.3:0.01 to 0.05 and the ratio of polymeric material to the water, wax and water soluble salt mixture is about 1:1.

More specifically, the ratio of water to beeswax to sodium borate is preferably about 1:.2:.014 and the ratio of polymeric material to water, beeswax and sodium borate is about 1:1 and wherein the composition coating impregnates the printed paper sheet whereby said sheet is rendered substantially hydrophobic and it and items placed on it, with the mat on a flat surface, are rendered substantially slip resistant. The waxes useful pursuant to the present invention are those generally having a molecular weight up to about 2,000, whereas the polymeric material should have a molecular weight in excess of 2,000 and preferably in excess of 5,000. The molecular weight of the polymeric material is greater than that for the wax.

The method for preparation of the coating composition more specifically comprises heating an amount of water to at least about 80° C. and also heating an amount of wax to at least about 70° C. whereby the wax melts. The ratio of water to wax should be about 1:0.1 to 0.3 and perferably 1:0.2. A water soluble salt is then added to the water so that the ratio of water to water soluable salt is about 1:0.01 to 0.05 and preferably 1:.014. The wax is then added to the water and salt mixture so that the ratio of water to wax to water soluble salt is about 1:0.1 to 0.3:0.01 to 0.05 and is preferably about 1:2:.014. Finally, this mixture is added to an approximately equal amount of a polymeric material.

It is preferable that the water be heated to at least about 80° so as to facilitate dissolving a water soluble salt, such as sodium borate, which is added to it. It is also preferable that the wax of the above method comprises a beeswax or other microcrystalline wax, however, waxes of other kinds and/or mixtures may be used. Furthermore, the wax should be heated to a temperature of at least about 70° C., so as to facilitate melting. In addition, it is preferable that the wax is added to the water and water soluble salt mixture while continuously stirring or otherwise agitating the resultant mixture. It may also be necesary to adjust the pH of this resultant mixture in order that it may more thoroughly mix with the polymeric material. It is also within the contemplation of this invention to have a higher wax to water ratio (more wax per volume water) if a harder coating is desired for the place mat. The amount of water soluble salt added would also increase proportionately with any increase in the amount of wax.

It has surprisingly been found that the coating composition of this invention prevents coated place mats from sticking together when stacked on top of one another. This feature greatly facilitates both ease of storage and subsequent handling. Furthermore, the place mats coated with the above coating composition are both inexpensive to produce and are extremely effective for providing a substantially hydrophobic and slippage resistant surface. The slippage resistant surface is especially significant when the coated place mat is used on the trays or tables of mass transit vehicles such as buses, boats, airplanes and trains, in addition to home use on dining room or kitchen tables, especially when children are present.

In the specification herein, there has been set forth a preferred embodiment of the invention, and although specific terms are employed, they are used in a generic and descriptive sense only and not for purposes of limitation.

Inasmuch as many changes could be made in the above constructions, and many apparently different embodiments of the invention could be made without departing from the scope thereof, it is intended that all matters contained in the above description shall be interpreted as illustrative and not in a limiting sense.

What is claimed is:

1. A non-slip place mat comprising:
   a. a paper sheet, said sheet comprising a composition coating on both sides; and
   b. said composition coating comprising a blend of water, a water soluble salt, a wax and a polymeric material having a molecular weight greater than the wax.
2. The place mat of claim 1, wherein the polymeric material is one selected from the group consisting of acrylics, natural and synthetic latex, and neoprene.
3. The place mat of claim 1, wherein the polymeric material is in a powdered solid form.
4. The place mat of claim 1, wherein the polymeric material is dispersed in solution.
5. The place mat of claim 1, wherein the polymeric material is dissolved in a solvent solution.
6. The place mat of claim 1, wherein the water soluble salt is sodium borate.
7. The place mat of claim 1, wherein the wax is comprised of one selected from the group consisting of beeswax and microcrystalline wax.
8. The place mat of claim 1, wherein the composition coating on the paper is about 1 mil. thick.
9. The place mat of claim 1, wherein the place mat further comprises printing on said paper sheet.
10. The place mat of claim 9, wherein the printing is on one side of the paper sheet.
11. The place mat of claim 10, wherein the composition coating is applied over the printing and non-printing side.
12. The place mat of claim 9, wherein the ink for printing is incorporated into the composition coating.
13. The place mat of claim 1, wherein the paper sheet is dyed during the formation.
14. The place mat of claim 1, wherein the weight ratio of water to wax to water soluble salt is about 1:0.1 to 0.3:0.01 to 0.05.
15. The place mat of claim 1, wherein the ratio of water, wax and water soluble salt to polymeric material is about 1:1.
16. The place mat of claim 1, wherein the paper sheet if comprised of paper with a weight from about 10 to 100 lbs./ream.
17. The place mat of claim 1, wherein the place mat is substantially rectangular.
18. The place mat of claim 1, wherein the polymeric material has a molecular weight of at least about 5,000.
19. A paper place mat comprising:
   a. a printed sheet; and
   b. a composition coating comprising a blend of water, sodium borate, beeswax and a polymeric material having a molecular weight of at least about 5,000.
20. The place mat of claim 19, wherein the polymeric material is an acrylic.
21. The place mat of claim 19, wherein the polymeric material is a latex.
22. The place mat of claim 19, wherein the ratio of water to beeswax to sodium borate is about 1:0.1 to 0.3:0.01 to 0.05 and the ratio of polymeric material to water, beeswax and sodium borate is about 1:1.
23. A method for preparing a coating composition for a paper place mat to render the mat slip resistant, comprising:
   a. heating an amount of water;
   b. melting an amount of wax;
   c. adding to the heated water of step a., an amount of a water soluble salt;
   d. adding the wax of step b. to the mixture of step c.; and
   e. adding the mixture of step d. to a polymeric material.
24. The method of claim 23, wherein the water is heated to at least about 80° C.
25. The method of claim 23, wherein the wax is heated to at least about 70° C.
26. The method of claim 23, wherein the ratio of water to wax to water soluble salt in step d. is about 1:0.1 to 0.3:0.01 to 0.05.
27. The method of claim 23, wherein the ratio of the mixture of step d. to the polymeric material of step e. is about 1:1.
28. The method of claim 23, wherein the polymeric material is in a powdered solid form.
29. The method of claim 23, wherein the polymeric material is dispersed in solution.
30. The method of claim 23, wherein the polymeric material is disolved in a solvent solution.
31. The method of claim 23, wherein the polymeric material is heated to melting temperature.
32. The method of claim 23, wherein the polymeric material further comprises a plasticizer.
33. The method of claim 23, wherein the polymeric material is one selected from the group consisting of acrylics, natural and synthetic latex, and neoprene.
34. The method of claim 23, wherein the wax is one selected from the group consisting of beeswax and microcrystalline wax.
35. The method of claim 23, wherein the water soluble salt is sodium borate.
36. A non-slip place mat comprising; a paper sheet, said sheet comprising a coating composition which comprises a blend of water, a water soluble salt, a wax and a polymeric material having a molecular weight greater than the wax on both sides of said sheet, said coating composition comprising means to provide slip resistance between one side of the mat and a tray surface, and slip resistance between the other side of the mat and articles disposed on the other side, and further comprising printing on said other side of said sheet and the composition coating being disposed on the printing and the printing being visible through the coating composition on said other side.

* * * * *